Patented July 3, 1945

2,379,696

UNITED STATES PATENT OFFICE 2,379,696

RECOVERY OF OLEFINIC HYDROCARBONS

Theodore W. Evans, Oakland, Calif., assignor to Shell Development Company, San Francisco, Calif., a corporation of Delaware No Drawing. Application May 13, 1940,
Serial No. 334,896

7 Claims. (Cl. 183—115)

This invention relates to a method for the separation, or purification, or both, of vapor mixtures of narrow boiling range comprising two or more hydrocarbon components of different degrees of saturation, by contacting such a vapor mixture with relatively high boiling liquid solvents. More particularly it relates to a process for separating diolefines from mono-olefines, paraffines and the like by contacting mixtures of these with low molecular weight aliphatic nitriles which function as selective solvents for the diolefines.

Processes of this type may be carried out in two principal ways. In the first the vapor may be scrubbed by the relatively high boiling selective solvent in a spray, packed, or bubble plate tower by a stream of selective solvent flowing countercurrently to the vapor. In the second method, the so-called extractive distillation, the solvent is caused to flow down a distillation column as the distillation proceeds and as the vapors ascend from the kettle. Thus the solvent scrubs the vapors in a first zone, selectively dissolving the more soluble component, and the resulting fat solvent is partially stripped in a second zone by vapor ascending from the distillation kettle having a higher temperature than the first zone. An improvement over this second method comprises operating the zones of contact substantially isothermally as is explained in a co-pending application Serial No. 329,482, filed April 13, 1940.

In the above methods the dissolved components are then recovered from the fat solvent by distillation, whereby a lean solvent is produced which is recirculated.

By application of the above methods it is frequently possible to separate constituents of a group of narrow boiling range compounds which would be quite impossible to separate by ordinary distillation methods.

The practicability of any such process depends on a number of factors, such as the relative volatilities of the dissolved materials, the concentrations of the solutes, the stability of the solvent, and the ease of separation of solutes and solvent. These factors vary with the temperature and pressure of the operation. This complexity prevents the setting up of a simple criterion for evaluating the "efficiency" of the process, and more particularly for evaluating the part played by the solvent in the determination of the final efficiency. Therefore progress must for the most part be made on an empirical basis.

It is the object of my invention to provide efficient processes for the separation or purification of hydrocarbon compounds of different degrees of saturation.

The solvents which I have discovered to give highly efficient separations when employed under the conditions described above are nitro-propanes, acetonitrile and propionitrile.

My solvents may be used either alone or mixed, and they are in general suitable for the separation in vapor-liquid extraction processes of hydrocarbons of greater degree of saturation from hydrocarbons of lesser degree of saturation, said hydrocarbons having boiling temperatures substantially below that of water and the solvent employed, being applicable to the separation of ethylene from ethane, propylene from propane, butadiene from butylenes, butane, etc., butylenes from butane, pentadienes such as isoprene from fractions containing five carbon atoms, cyclopentadiene from cyclopentane or pentanes, etc.

The most suitable operating temperature varies with the pressure maintained during the operation and is a compromise, since in general the selectivities of these solvents seem to increase with an increase in temperature, while simultaneously there is a decrease in the absolute solubility as the temperature is increased, so that at the boiling temperature of the solvent at the existing pressure substantially no hydrocarbon will dissolve no matter how high the "selectivity" might become. In general I prefer to operate at a temperature substantially below the boiling point of the solvent but slightly above the condensation temperature of the most readily condensable constituent of the vapor at the existing pressure. For example, as found by experiment when employing acetonitrile at substantially atmospheric pressure as solvent for the separation of butadiene from butylenes, normal atmospheric temperatures, e. g. about 20° C., are very suitable.

Substantially atmospheric pressures may be maintained, though the extraction may be carried out either at super or subatmospheric pressures if care is taken to adjust the temperature so that the mixture to be extracted does not condense and the solvent does not vaporize excessively. It is sometimes desirable to operate under superatmospheric pressure. For example, operation under 25 to 100 lbs. gauge pressure for butadiene separation, not only reduces the column size but also appreciably lowers the thermal requirements compared to those needed at atmospheric pressure. Also, a superatmospheric pressure may be useful to suppress foaming of the The amount of the solvent should be at least sufficient to dissolve a major portion of the constituent to be extracted. In some cases a considerable excess over this amount may be used especially when it is desired to scrub the last traces of the more soluble constituent from the vapor. The most economical amount varies with the nature of the solvent involved, the temperatures and pressures employed and the particular mixture to be extracted. It can be found by experiment.

Regeneration of the solvent may be carried out by any of the conventional methods such as e. g. heating, and/or the reduction of pressure, and the thus regenerated solvent returned to the contact zone for use in another cycle.

Example

A mixture of 38.5% butadiene and 61.5% butylenes in the vapor state was countercurrently extracted in a 68 plate extraction column with acetonitrile, the butadiene feed mixture entering the column about the middle under the conditions described below. The run was isothermal, the column being jacketed by a recirculating water jacket. The pressure maintained in the run was substantially atmospheric. The solvent was heated at the base of the column to provide the return butadiene to the column.

Solvent _____ Acetonitrile
Solvent feed rate_____ 18.6 c. c./min.
Gas feed rate_____ 250 c. c./min.

The analysis of the products follows:

Per cent
Butadiene content of top product_____ Approx. 3
Butadiene content of bottom product_____ 95

The above data show acetonitrile to be a very efficient solvent.

I claim as my invention:

1. A process for the separation of butadiene from butylenes which comprises contacting a gaseous mixture of butadiene and butylenes with liquid acetonitrile to selectively dissolve butadiene, separating the residual gas from the liquid solution containing butadiene, and heating the solution to recover butadiene therefrom.

2. A process for the separation of butadiene from butylenes which comprises contacting a gaseous mixture of butadiene and butylenes with liquid propionitrile to selectively dissolve butadiene, separating the residual gas from the liquid solution containing butadiene, and heating the solution to recover butadiene therefrom.

3. A process for the separation of butadiene from butylenes which comprises contacting a gaseous mixture of butadiene and butylenes with a liquid solvent of the group consisting of acetonitrile and propionitrile to selectively dissolve butadiene, and separating the residual gas from the liquid solution containing butadiene.

4. A process for the separation of butadiene from butylenes and butanes which comprises contacting a gaseous mixture of butadiene, butylenes and butanes with a liquid solvent of the group consisting or acetonitrile and propionitrile to selectively dissolve the butadiene, and separating the residual gas from the liquid solution containing butadiene.

5. A process for the separation of a diolefin from a gaseous hydrocarbon mixture containing a diolefin and a corresponding mono-olefin which comprises contacting the gaseous hydrocarbon mixture with a liquid solvent of the group consisting of acetonitrile and propionitrile to selectively dissolve the diolefin, and separating the residual gas from the liquid solution containing the diolefin.

6. A process for the separation of pentadienes from pentenes and pentanes which comprises contacting a gaseous hydrocarbon mixture containing pentadienes, pentenes and pentanes with a liquid solvent of the group consisting of acetonitrile and propionitrile to selectively dissolve the pentadienes, and separating the residual gas from the liquid solution containing the pentadienes.

7. A process for the separation of isoprene from pentenes which comprises contacting a gaseous hydrocarbon mixture containing isoprene and pentenes with a liquid solvent of the group consisting of acetonitrile and propionitrile to selectively dissolve the isoprene, and separating the residual gas from the liquid solution containing the isoprene.

THEODORE W. EVANS.